United States Patent [19]

Willinger

[11] Patent Number: 4,622,148
[45] Date of Patent: Nov. 11, 1986

[54] AQUARIUM FILTER SYSTEM

[75] Inventor: Allan H. Willinger, Franklin Lakes, N.J.

[73] Assignee: Willinger Bros., Inc., Englewood, N.J.

[21] Appl. No.: 748,522

[22] Filed: Jun. 25, 1985

[51] Int. Cl.$^4$ ............................ C02F 3/04; C02F 3/06; A01K 63/04

[52] U.S. Cl. .................................. 210/615; 210/616; 210/169; 210/416.2; 210/460; 210/356; 210/508; 210/150; 119/5

[58] Field of Search ...................... 210/169, 416.2, 460, 210/354, 356, 497.01, 615–617, 150, 500.1, 508, 505; 119/5, 3

[56] References Cited

U.S. PATENT DOCUMENTS

| | | | |
|---|---|---|---|
| 2,769,779 | 11/1956 | Vansteenkiste et al. | 210/460 |
| 2,956,507 | 10/1980 | Hutchinson | 210/169 |
| 2,985,308 | 5/1961 | Koupal | 210/169 |
| 3,302,789 | 2/1967 | Holt | 210/169 |
| 3,549,015 | 12/1970 | Willinger | 210/416.2 |
| 3,630,364 | 12/1971 | Johnston | 210/169 |
| 4,209,307 | 6/1980 | Leonard | 55/29 |
| 4,263,139 | 4/1981 | Erlich | 210/169 |

FOREIGN PATENT DOCUMENTS

644693 10/1950 United Kingdom ................ 210/169

Primary Examiner—Benoit Castel
Attorney, Agent, or Firm—Pennie & Edmonds

[57] ABSTRACT

A filter assembly for use in filtering and treating contaminated water in an aquarium tank. A filter bag (10) is used for receiving a continuous supply of contaminated water (14) under a predetermined pressure. The walls (12) of the filter bag are made at least partially of a porous filter membrane formed of a matrix of pressure displaceable fibrous material. As the filter clogs with contaminants, bacterial growth and accompanying by-products, the fibrous material is displaced to increase the size of the interstices of the matrix to permit water to continue to flow through the interstices and continue filtering.

18 Claims, 11 Drawing Figures

AQUARIUM FILTER SYSTEM

This invention relates to aquarium filters, and more particularly to an aquarium filter utilizing a filter bag or receptacle for filtration, treatment and aeration of contaminated aquarium water.

BACKGROUND OF THE INVENTION

The field of aquarium filters has been quite developed because of the many hobbyists and professionals maintaining fish tanks which require that contaminated aquarium water be filtered and decontaminated before it is recirculated into the aquarium tank. Structurally, a filter apparatus is comprised of filtration material in the form of particles of activated carbon or charcoal and a fluffy mass of synthetic resin fibers. Sand or gravel beds are well known materials used in undergravel filters. The filtration material is generally retained within a housing specially constructed for that purpose and the unit may be of the type which is disposed externally of the aquarium tank or within the tank water. In almost all of these, however, an appropriate housing is essential to retain the filtration material, as are means to provide a circulation pathway through which the contaminated water passes and is treated.

Aquarium filters have become quite sophisticated pieces of apparatus and in order to provide both filtration and aeration, complex arrangements have been fabricated. Air lifts and centrifugal pumps comprise the means utilized in aquarium filters to lift and recirculate the aquarium water as it is treated and decontaminated. The housings which are utilized often have complex compartments which typically include a receiving compartment for the contaminated water and a clear water chamber into which the aquarium water from the receiving chamber is caused to flow and in so doing it is caused to pass through filtration materials which decontaminate it prior to being discharged back into the aquarium tank.

Despite the complexity of filter designs, many aquarium filters leave something to be desired with respect to sufficient aeration of the water. Additionally, cleaning of the filter becomes a complicated and often messy procedure. Often filter apparatus must be disassembled so as to gain access to the interior of the housing for its removal and replacement by fresh filter material. The filtration material becomes clogged in a relatively short period of time and the failure to change the material prevents filtration.

In conventional aquarium filtration, the water pressure provided by the pump is sufficient to cause a flow of water through a filter or porous wall so that mechanical filtration of the solid contaminants occurs, the walls acting as a sieve. As waste material accumulates and concurrent biologic action occurs, sludge or slime formation is initiated, and the pores of the filter membrane become clogged and progressively reduce the water flow and consequent filter action. This clogging action continues to the point that flow through the filter wall ceases. The conventional practice is to remove, replace or clean the filter material when clogging has progressed to the point that the flow of water is materially reduced or ceases entirely.

The most effective water purification is achieved at such time wherein the accumulation of waste material serves as a biologic nutrient and sludge formation and biologic bacterial propagation are at a high point. However, at this point excessive clogging of the filter occurs and effective flow and filtration ceases. Replacement of the filter with fresh filter material destroys the most effective environment for maximum aerobic bacterial growth and consequent water decontamination and purification.

Accordingly, although aquarium filters have at times been sophisticated in their designed structure, there is still an unfulfilled need for improvement in the aeration, filtration and water purification capabilities of aquarium filters and the ability to keep the filter in efficient operative condition without requiring frequent maintenance or cleaning.

SUMMARY OF THE INVENTION

The present invention is based upon a novel approach to aquarium filters. In the present invention there is provided a filter assembly typically in the form of an enclosed filter bag, pouch or receptacle into which a continuous supply of contaminated aquarium water drawn from the tank is introduced under a predetermined pressure. The wall of the filter assembly is comprised of or at least includes a water permeable, stretchable filter membrane structure. The membrane structure is preferably formed of an open web closely spaced or randomly disposed fibrous or filamentary material which forms a matrix and provides numerous enlargeable interstices or pores defining water passages from the interior of the assembly to the exterior thereof. The filamentary matrix is of such density that as water-bearing solid waste material and other contaminants is continuously pumped into the assembly and as bacterial growth with its concurrent slime accumulates, the water passages in the membrane structure become increasingly clogged and cause a progressive increase of water pressure interiorly of the filter assembly. Such pressurization causes physical stretching or ballooning of the filter membrane structure and sufficient displacement of the matrix and the clogging material to permit water to flow, seep or ooze continuously through and about the surface of the filter membrane structure whereby the filter assembly is maintained in continuous operation for a more extended period than has heretofore been attainable.

Passage of the water through the interstices in the membrane structure causes mechanical filtration of the water by retaining the solid waste and contaminants interiorly of the membrane structure, as well as within and about the pores or interstices in the wall thereof. The filter assembly may be partially or completely submerged, or it may be completely above the water level of the aquarium tank.

Because of the presence of the organic waste material and the presence of oxygenated water in the wall interstices and along the exterior of the membrane structure, aerobic bacteria are provided with a favorable environment for propagation along the wall surfaces and within the walls of the filter assembly. Such aerobic bacteria cause purification of the contaminated water by acting upon, digesting or converting the contaminating material as it is mechanically filtered from the water. Thus, destructive cleaning of the filter element is delayed without disturbance over vastly increased periods of time.

As a result, the present filter assembly provides an improved, longer lasting and more efficient filter by combining the capabilities of filtration material along with the purification process of a plethora of aerobic bacteria acting upon the contaminants which accumulate in the filter assembly interior.

In the present filter assembly utilizing a sealed bag or pouch, the membrane walls of which are porous and act as a filter, a supply source, such as a pump, supplies contaminated water drawn from the aquarium tank and discharges it under pressure into the interior of the bag. The bag is thus progressively caused to become increasingly distended. As the biologic activity develops and the pores begin to become clogged, a point is reached where the pressure rise is sufficient to cause stretching of the membrane wall structure to open the clogged pores of the bag walls and displace some of the clogging material which has accumulated on the filter membrane wall. The throughput is therefore continuously maintained. Even with a highly contaminated bag, the water seeps or oozes at a rate which not only maintains, but increases the efficiency of the filter arrangement.

Although highest overall efficiency is maintained while the filter assembly is completely or partially exposed to the atmosphere, it may be partially or completely submerged and still maintain a high level of efficiency. The filter assembly may take the form of an elongated bag or pouch which extends across the top of the tank and can include additional filtration material such as activated carbon granules disposed internally of the bag to further enhance the chemical filtration process.

Accordingly, it is an object of the present invention to provide an aquarium filter assembly which achieves and maintains filtration and purification efficiency through the combination of mechanical, chemical and biological filtration and which includes means for overcoming clogging for extraordinarily extended periods.

Another object of the present invention is to provide an improved aquarium filter assembly which provides a progressively greater surface area for filtration and aeration.

A further object of the present invention is to provide an aquarium filter assembly wherein filtration is improved with continued use.

Yet another object of the present invention is to provide an aquarium filter assembly which utilizes biological means to purify the contaminated water and increase the operative longevity of the aquarium filter.

Still a further object of the present invention is to provide an aquarium filter membrane structure which is self-regulating, whereby the filter assembly overcomes clogging by means of pressure changes occurring with continued usage, so as to permit use of the filter assembly for considerably longer intervals of time before requiring replacement.

Another object of the present invention is to provide an aquarium filter assembly utilizing a filter membrane structure which can be made self-supporting or be supported with respect to the aquarium tank and provides flowthrough means for the contaminated water, thereby providing mechanical filtration and simultaneous chemical and biological treatment of the contaminated water and for the return of the filtered clean water to the aquarium tank.

With the filter assembly partially or fully exposed to the atmosphere, the membrane structure of the assembly becomes covered with water which, in turn, is thus exposed to the atmosphere. This exposure is along a large surface area and this permits increased absorption of oxygen from the atmosphere and consequently increased aerobic bacterial propagation. Contaminating material is separated, retained, biologically acted upon and decontaminated in the interior and along the walls of the filter assembly. The pressure displaceable filamentary membrane structure of the filter assembly provides a support surface area, as well as increased dwell time for the propagation of aerobic bacteria, which cause increased biological conversion of the contaminating material to non-toxic form.

DETAILED DESCRIPTION OF THE INVENTION

Figure 1:
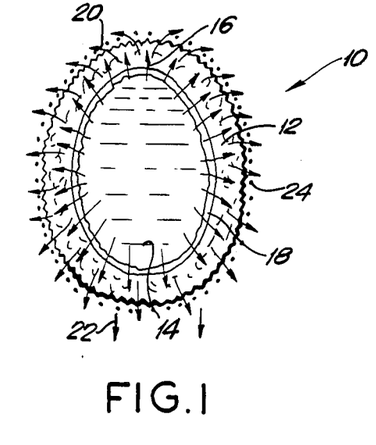
FIG. 1 is a cross-sectional view of the membrane structure of the preferred embodiment of the filter assembly of the present invention.
Figure 2:
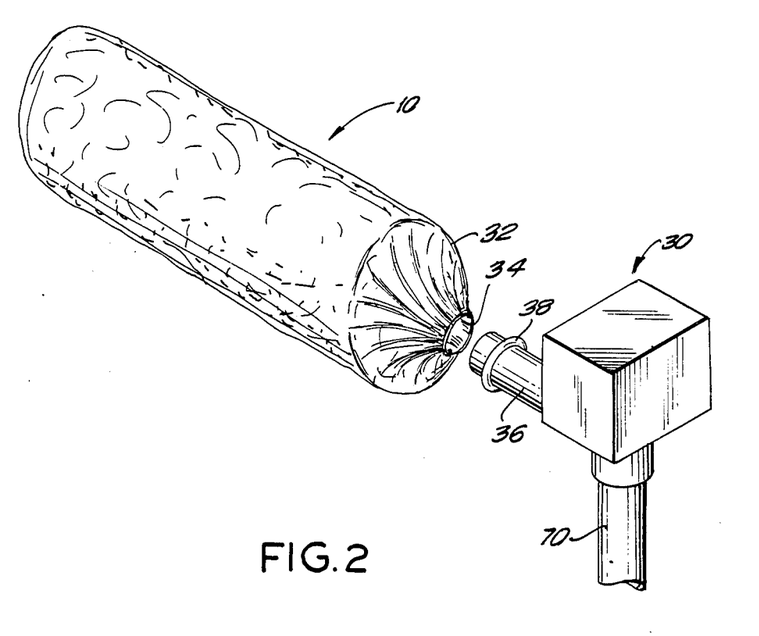
FIG. 2 is an exploded view of the preferred embodiment of the filter assembly in accordance with the present invention.

The operation of the filter assembly of the present invention can best be described with respect to FIGS. 1 and 2. The filter assembly is constructed in the form of an elongated filter bag 10 whose wall 12 is formed of pressure displaceable closely and preferably randomly disposed spaced stretchable filamentary material. This structure provides a plurality of pores or interstices defining water passages from the interior of the assembly to the exterior thereof. The wall, which defines a filter membrane structure, can be of synthetic resin such as unbranded, garnetted, bonded and lofted polyester fiberfill as, for example, available from Eastman under the trademark Kodosoff or Kodofill or from Dupont under the trademark Hollofil. It can also be in the form of interwoven sheet material characterized by elasticity or displaceability upon application of water pressure. Other materials which may be suitable are formed of foamed porous polyurethane sheeting, or elasticized fabrics such as Spandex.

Aquarium water 14 is pumped into the interior of the bag receptacle by a supply means such as a centrifugal water pump. The density of the walls of the bag is such that the water will initially flow freely and subsequently seep or ooze through the walls as the pores and passages begin to clog. Pressurization of the water in the bag increases progressively due to this clogging and forces the receptacle walls to distend and expand in a ballooning effect. The filamentary material forming the membrane structure is displaced under the increased pressure causing the interstices to enlarge so that the water continues to flow.

As the water passes outwardly through the walls as shown by the arrows 16, solid waste and other contaminants from the aquarium water are retained internally of the bag as shown at 18. Some of the contaminants may be retained within the pores and interstices of the wall itself and spread along the outer surface itself.

It should be appreciated that although the filter assembly may be partially or not at all submerged within a body of water because of the pressurization effect, the interior of the receptacle will nevertheless be filled with water. As a result, the water will seep, ooze or flow out of the bag on all sides thereof as indicated by the dots 24. The water flow wets and proceeds along the exterior periphery thereof, as shown by the arrows 20. The water will flow about the entire exterior surface as it continues to move. As it reaches the bottom, as shown by the arrows 22, the water will flow or drip back into the aquarium tank.

As the water flows, seeps or oozes through the openings and flows about the entire exterior surface, unless it is completely submerged, it becomes exposed to the atmosphere along a large absorption surface area. The entire receptacle wall and particularly the exterior surface becomes bathed in atmospheric oxygen which stimulates extraordinary aerobic biological activity. When the bag or receptacle is completely submerged, aerobic biological activity is supported by the dissolved oxygen in the aquarium water, but not necessarily to the same degree as is the case with atmospheric exposure.

Because of the presence of oxygen within and about the surface of the bag, and because of the presence of the organic contaminants interiorly of the filter assembly and within its walls, the propagation of aerobic bacteria is enhanced. Such aerobic bacteria flourish in the presence of the oxygenated water and use the contaminants as a source of breeding and nutrition. The aerobic bacteria will thereby be present around the entire surface of the membrane structure and will penetrate into its walls to attack and digest the contaminants. This conversion of the contaminants acts to purify the aquarium water as it passes through the filter assembly and its membrane wall.

The present aquarium filter assembly thereby provides greater effective filtration after continued use than prior art filters. During experimental use, it has been found that the present filter assembly could be utilized for unexpectedly longer periods of time, as compared to ordinary gravity filters. It has been found that ordinary gravity filters require filter material replacement as many as 5-10 times during the same period of time that the present filter bag was able to be kept in effective continued use with superior water clarity.

When the present filter bag ultimately becomes so clogged that it requires replacement, all that is necessary is to remove the filter bag from the supply means and replace it with another filter bag.

It should therefore be appreciated that the present filter assembly is self-regulating. As the contaminants are collected internally of the bag and within and on the bag walls, the accumulation and increase of contaminants causes an increase in aerobic bacterial population which results in greater digestion of the contaminating material to further increase the purification of the water. Thus, contrary to other filters, the greater the accumulation of waste, the greater the purification capability of the filter as long as water movement is maintained, and with the present invention, the stretchable nature of the filter membrane structure of the filter assembly permits this continued flow.

As shown in FIG. 2, the requirements needed for the preferred embodiment of the aquarium filter assembly include the filter bag 10 and a supply source such as a centrifugal pumping unit 30 for providing the contaminated water supply from the aquarium tank into the filter bag. The filter bag itself is shown constructed in an elongated shape which, when filled with water, can be disposed horizontally. By retaining the bag in a horizontal position, water pressure is evenly distributed in the filter bag causing uniform water distribution flow through the length of the bag and consequently a more even distribution of contaminants within the bag. The horizontal positioning also permits access for more convenient installation and replacement of the bag in addition to providing direct access to the atmosphere.

At one end 32 of the enclosed bag 10, there is provided an opening 34 in the form of a port or mouth through which the contaminated water is fed. The mouth 34 receives an outlet 36 of the supply means 30. A suitable collar 38 can be placed around the outlet 36 so as to securely engage the mouth 34. The supply means 30 can be any of the well known pumping devices utilized to pump contaminated water into a filter. For example, it can be a centrifugal pump or other similar pumping device. One pump supply means is shown and described in copending application Ser. No. 596,530 assigned to the Assignee of the present invention, now U.S. Pat. No. 4,589,982 and entitled "Removable Power Pack Pump Assembly."

Figure 3:
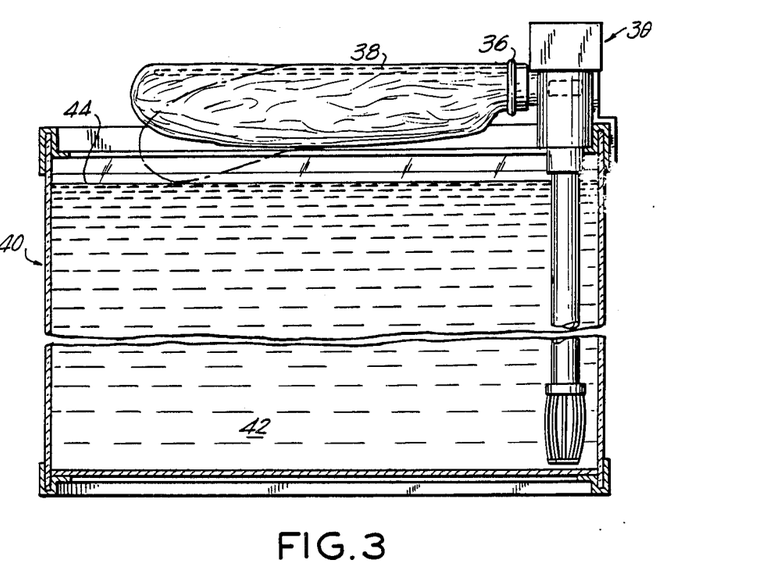
FIG. 3 is a cross-sectional view showing an embodiment of the present invention wherein the filter assembly extends across the top of an aquarium tank.

In operation, the filter bag 10 with one end connected to the outlet 36 of the pump 1 as shown in FIG. 3, can, if necessary, be supported by an internal rod 38 connected to and extending from the outlet 36. Also, the level of the water in the aquarium can be adjusted to give support to the free end of the bag. As shown in FIG. 3, the aquarium tank 40 is shown to include water 42 to a level 44. The solid line showing of the bag shows it positioned above the water level 44, while the dotted line representation shows the free end supported on the surface of the water 42 when no support rod is used.

Figure 4:
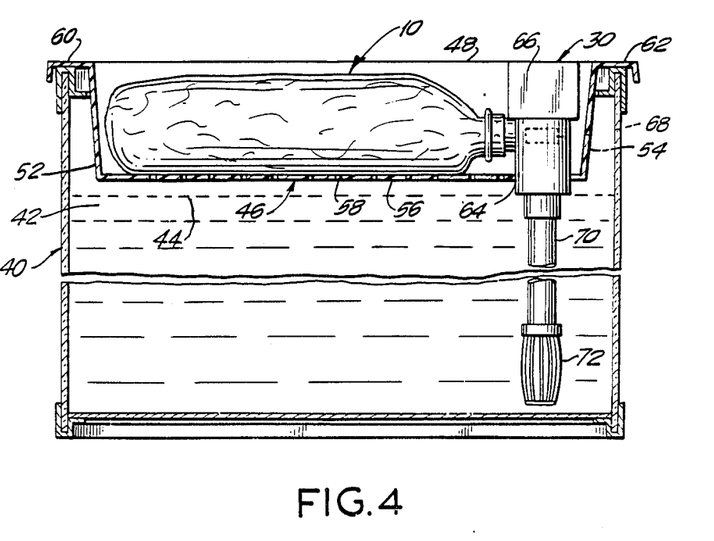
FIG. 4 is a cross-sectional view of the aquarium filter like that shown in FIG. 3 with the filter being supported in a trough at the top of an aquarium tank and above the water level.

The bag can also be more fully supported with respect to an aquarium tank in numerous ways. As shown in FIG. 4 for example, it can be supported across the top of an aquarium tank 40 and completely out of the aquarium water 42. Specifically, in FIG. 4, the bag form of the aquarium filter assembly is located in a U-shaped trough 46 having elongated opposing side walls 48 and end walls 52, 54. A bottom wall 56 closes off the bottom. Slots 58 are formed on the bottom wall 56 to maintain the bag completely out of the water.

A pair of opposing overhanging lips 60, 62 are provided for overlying the rim of the aquarium tank and supporting the aquarium filter.

The filter bag 10 of the present invention is inserted in the trough. The powered pump supply means 30, heretofore described, is disposed in the trough and extends downwardly through an opening 64 in the base wall 56 of the trough and depends into the aquarium tank.

The particular power water supply means 30 is shown to include a suitable power unit 66 which drives an impeller 68 which in turn lifts the water through a lift tube 70 at the bottom of which is provided a strainer 72. Other suitable water pumping arrangements may be employed for driving water from the aquarium tank and introducing the same into the filter receptacle.

Figure 5:
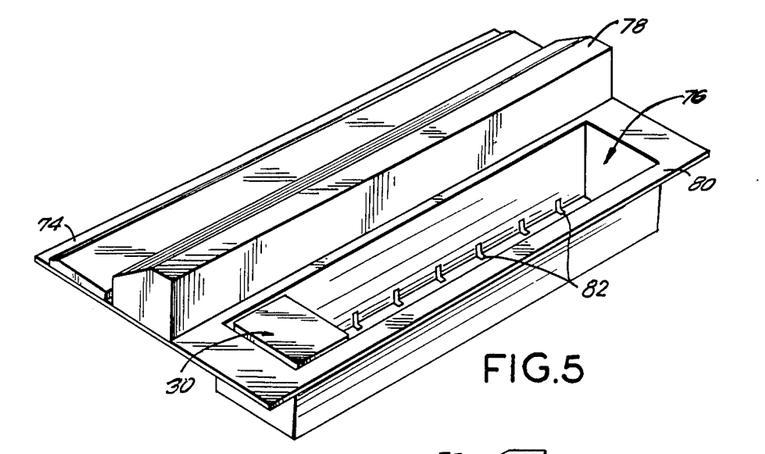
FIG. 5 is a perspective top view of an embodiment of the filter receptacle support of the present invention incorporated in a tank cover.
Figure 6:
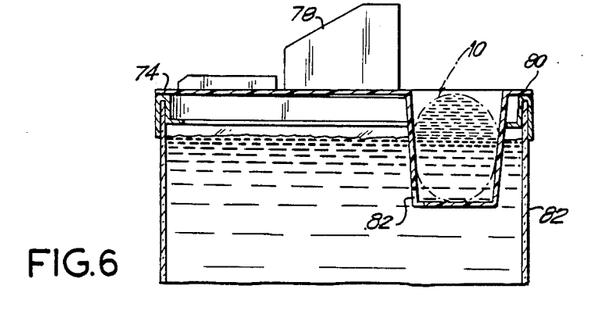
FIG. 6 is a cross-sectional view taken through the aquarium filter shown in FIG. 5 with the filter supported on an aquarium tank.

As shown in FIGS. 5 and 6, the aquarium filter can be formed integrally with a conventional aquarium hood and reflector. As shown in the base wall 74, there is formed a depending trough unit 76 in which the filter bag 10 is inserted. A pump supply means 30 is also included in this area. Spaced adjacent to the trough area 76, there is provided the standard hood and reflector unit 78 which can be formed directly on the base wall 74.

The base wall 74 is formed with a peripheral lip portion 80 which is used to support the entire unit which thus rests on the upper edge of an aquarium tank 40, as shown in FIG. 6. Finally, the lower back wall corner of the trough 76 is provided with slots 82 through which the filtered water is fed back into the aquarium tank.

Figure 7:
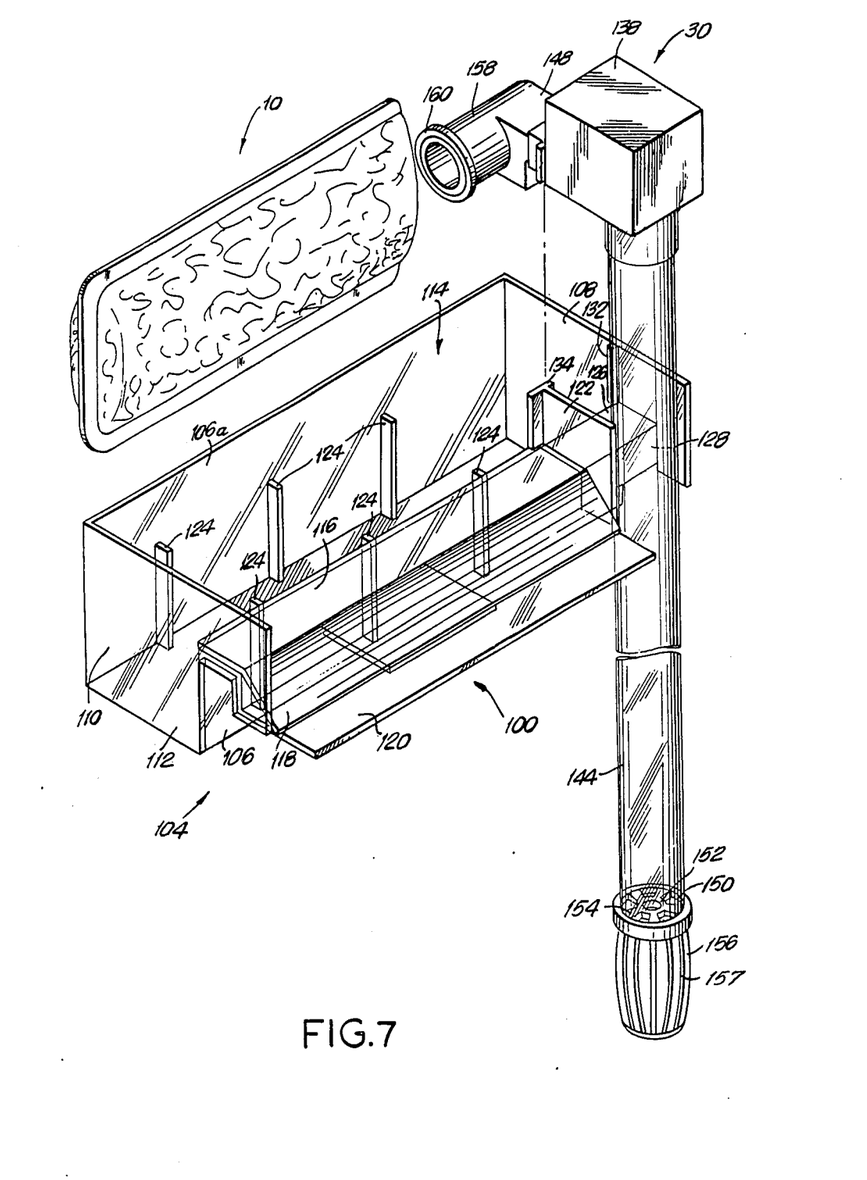
FIG. 7 is a perspective exploded view of an external housing unit for use in supporting the aquarium filter of the present invention externally of the aquarium tank.

Referring to FIG. 7, there is shown an exploded perspective view of yet another arrangement for the aquarium filter assembly of the present invention. In this embodiment, the support for the filter bag includes a housing unit 100 which can be positioned exteriorly on the upper edge of the aquarium tank so as to overhang the exterior of the aquarium tank.

The housing 100 includes a substantially rectangular walled unit having front and rear walls 104, 106; a pair of opposing end walls 108, 110; and a base wall 112. The top is shown to be open; however, it is understood that a cover could be placed on the housing if so desired. The composite walls of the housing unit define a substantially rectangular internal chamber 114 which serves as the clean water chamber for collecting and returning the clean water into the tank after filtration and purification.

The front wall 104 is lower than both the rear wall 106 and the side walls 108, 110 and terminates in a forwardly projecting horizontal ledge 116 from which extends a downwardly angled spillway 118. A forward ledge 120 projects from the distal end of the spillway to direct the clean water back into the aquarium tank.

The spillway extends for a major portion of the width of the filter housing, but not necessarily across its entirety. It terminates at a middle wall 122 which extends forward from the front wall 104 and is substantially parallel and similar to the opposing end walls 108, 110.

Vertical reinforcing ribs 124 are provided interiorly along at least a portion of the rear wall 106 and along the front wall 104 for improving rigidity of the housing, as well as for positioning and spacing the filter bag 10 away from the walls within the chamber 114. The horizontal ledge 116 serves as an upper shoulder upon which the aquarium filter housing sits on the aquarium tank wall. Spaced between the right side wall 108 and the medial wall 122 there is provided a horizontal shelf 126 terminating in a downwardly depending ledge 128. The shelf 126 and ledge 128 define a seat for the intake water supply assembly, shown generally at 30. A pair of opposing tongues 132, 134 are provided on walls 108, 122 which are respectively received in grooves defined on opposing sides of a head portion 138 of the intake assembly. This tongue and groove arrangement facilitates removability of the intake assembly from the housing unit.

The intake water supply assembly 30 is removably seated upon the shelf 126 and its head portion houses a motor pumping unit retained within an enclosed compartment sealed from contact with the water. The intake assembly also includes a depending elongated cylindrical hollow inlet tube 144 which extends downward into the water in the aquarium tank. A strainer 156 having elongated slots 157 is coupled at the distal end of the inlet tube, as is well known in the art. A plate 150 in the form of a hub 152 with spokes 154 connects the strainer to the tube.

At the upper end of the intake assembly is a passageway 148 with an outlet nozzle 158 having an enlarged peripheral collar 160. The outlet nozzle is positioned to discharge contaminated aquarium water into the filter bag 10 situated in the clean water compartment 114.

In operation, the filter bag 10 is placed on the discharge nozzle 158 of the intake assembly and the intake assembly with the bag is seated in place on the housing unit. The motor unit is connected to a source of electricity. The energized motor unit causes the rotor and a pump impeller to rotate, thereby causing contaminated water to be drawn up through the strainer and into the inlet tube passing though a passageway and thence through the discharge nozzle into the filter bag 10. The water passes through the interstices in the membrane walls of the filter bag for purification, filtration and aeration. The interstices enlarge as pressure is built up in the interior of the bag due to the accumulation of bacterial growth and slime, thus permitting continued flow of water through the interstices. The treated water drips into the clean water chamber in the housing unit and is stored until its water level rises to the height of the spillway. The water then overflows the spillway and returns back to the aquarium tank.

Figure 8:
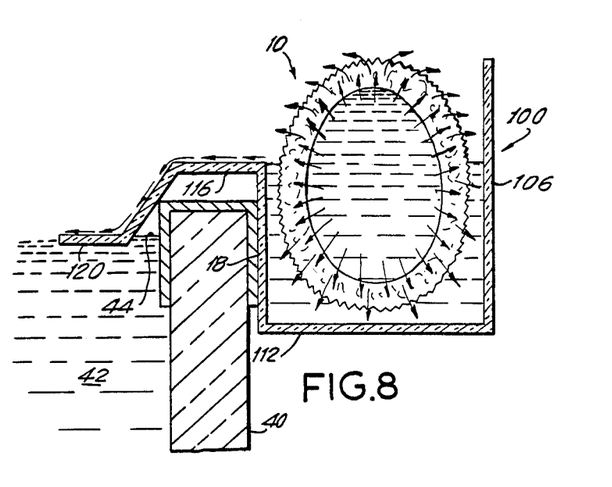
FIG. 8 is a cross-sectional view of the housing unit of FIG. 7 showing the filter bag partially submerged.
Figure 9:
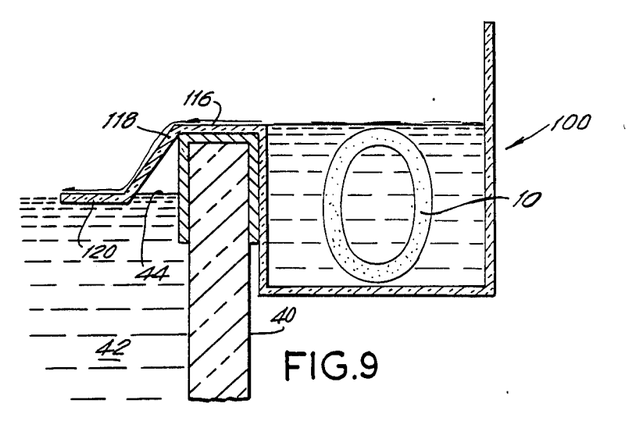
FIG. 9 is another cross-sectional view of the housing unit of FIG. 7 showing the filter bag fully submerged.

FIGS. 8 and 9 are cross-sectional views of the housing unit 100 of FIG. 7 shown positioned on an aquarium tank 40. As shown in FIG. 8, the filter bag 10 is positioned in the housing 100 with its upper surface above the spillway ledge 116. Thus, it is only partially submerged in the treated water contained in the housing. Alternatively, the filter bag 10 can be positioned, as shown in FIG. 9, below the ledge 116 and fully submerged in the treated water.

Figure 10:
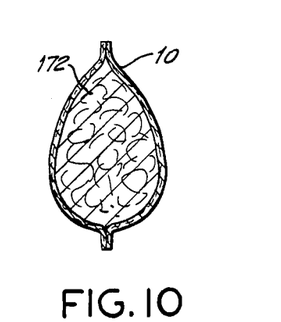
FIG. 10 is a cross-sectional view taken through a filter bag of the present invention and showing the use of additional filtration material therein such as a mass of loose synthetic resin filaments.
Figure 11:
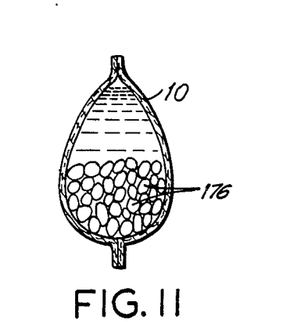
FIG. 11 is a cross-sectional view taken through a filter bag of the present invention and showing the use of activated carbon or charcoal in the filtration bag for providing additional water treatment and filtration.

As shown in FIGS. 10 and 11, inside the filter bag there can be included additional filtration material. For example, within the filter bag 10 shown in FIG. 10, there is included additional filtration material, such as filter floss or glasswool 172. In FIG. 11, the filter bag 10 includes activated carbon or charcoal 176 within its internal compartment. Other filtration and water treating material can likewise be included within the filter bag.

I claim:

1. A filter assembly for use in filtering and treating contaminated water in an aquarium tank comprising:
   (a) a contaminated water receiving filter bag for receiving a continuous supply of contaminated aquarium water pumped under a predetermined pressure into the interior of said bag;
   (b) the walls of said bag being comprised at least in part of a porous filter membrane formed of a matrix of pressure displaceable fibrous material defining a plurality of enlargeable interstices sized in their unenlarged state to permit initial relatively free flow of water therethrough while preventing the passage of solid contaminants and presenting surfaces about the interstices which form support for aerobic bacterial growth; and
(c) pressure supply means for supplying said contaminated aquarium water to the interior of the bag at a pressure sufficient to displace said fibrous material and enlarge said interstices defined thereby as said contaminants, bacterial growth and accompanying by-products clog the interstices to thereby permit the water to flow through the interstices and continue the filtering and treating process.

2. A filter assembly for the purification of contaminated aquarium water in an aquarium by the action of aerobic bacteria, said assembly comprising:
(a) a stretchable membrane structure in the form of a stretchable bag having an inlet for receiving said contaminated water in the interior of the bag having a plurality of enlargeable interstices defining water passages extending from one side of the membrane structure to the other, said membrane structure providing support surface area for the propagation of aerobic bacteria capable of acting upon and digesting said contaminating material; and
(b) pressure supply means for supplying contaminated aquarium water through said interstices from said one side of the membrane structure to the other at a pressure sufficient to stretch said membrane structure and enlarge said interstices as they become clogged by the accumulation of said contaminating material and bacteria whereby the flow of water through the interstices is continued.

3. The filter assembly according to claim 2, wherein:
(a) said membrane structure is comprised of a batting of randomly disposed filamentary material.

4. The filter assembly according to claim 3, wherein:
(a) said randomly disposed filamentary material is comprised of a synthetic resin.

5. The filter assembly according to claim 4, wherein:
(a) said filamentary material is in the form of randomly bonded polyester staple fiber layers.

6. The filter assembly according to claim 2, further comprising:
(a) support means for supporting the filter bag at least partially above the level of water in the aquarium.

7. The filter assembly according to any of the claims 2-6, further comprising:
(a) loose filtration material contained with said bag.

8. In a filter assembly for use in filtering contaminated water in an aquarium tank, the improvement comprising:
(a) a filter bag having membrane structured walls formed of water permeable stretchable filtration material and defining enlargeable interstices therethrough of an unenlarged size to require a pressurization of the water internally of the bag to achieve passage of the water therethrough;
(b) an inlet in said filter bag for receiving contaminated water for filtration by the filter bag walls;
(c) said membrane structural walls define surfaces about said interstices forming support for aerobic bacterial growth tending to clog said interstices; and
(d) said filtration material is stretchable to enlarge said interstices upon increased pressure internally of said bag as the interstices become clogged with said bacterial growth.

9. The improvement according to claim 8, wherein:
(a) said membrane structural walls are comprised of a batting of randomly disposed, pressure displaceable filamentary material.

10. The improvement according to claim 9, wherein:
(a) the filamentary material is in the form of randomly bonded synthetic resin fiber layers.

11. The improvement according to claim 10, wherein:
(a) said filter bag has a generally elongated shape with said inlet at one end thereof.

12. A process for filtration, decontamination and aeration of aquarium water which comprises:
(a) feeding contaminated aquarium water into an enclosed receptacle, a wall of which is formed of stretchable filter material having enlargeable interstices defining water passages from the interior of said receptacle to the exterior surface thereof;
(b) exposing said receptacle to the atmosphere whereby the contaminating material is retained in the interior of the receptacle and is aerated by exposure to the atmosphere upon emergence therefrom, the stretchable material providing support surfaces for the proliferation of aerobic bacteria whereby the bacteria are exposed to the contaminating material for action thereon; and
(c) redirecting the treated water into the aquarium tank.

13. The process according to claim 12, further including the steps of:
(a) feeding the contaminated water to the interior of the receptacle at a pressure sufficient to cause stretching of said filter material as the interstices become clogged by contaminants and bacterial growth to enlarge said interstices and thereby permit the continued passage of water therethough.

14. A filter assembly for the purification of contaminated aquarium water in an aquarium by the action of aerobic bacteria, said assembly comprising:
(a) a stretchable membrane structure in the form of a stretchable bag having an inlet for receiving said contaminated water in the interior of the bag and having a plurality of enlargeable interstices defining water passages extending from the interior of the bag to the exterior thereof, said membrane structure providing support surface area for the propagation of aerobic bacteria capable of acting upon and digesting said contaminating material;
(b) pressure supply means for supplying contaminated aquarium water through said interstices from the interior of the bag to the exterior thereof at a pressure sufficient to stretch said membrane structure and enlarge said interstices as they become clogged by the accumulation of said contaminating material and bacteria whereby the flow of water through the interstices is continues; and
(c) a trough located entirely above the level of water in the aquarium, said trough having openings in the bottom thereof for directing water passing through the interstices in the wall of the bag, from the interior thereof to the exterior, back to said aquarium.

15. The filter assembly according to claim 14, wherein the support means comprises:
(a) a trough having its lower portion disposed in the water of the aquarium and its upper portion above said water, said trough having openings in the upper portion for directing water passing through the interstices in the wall of the bag, from the interior thereof to the exterior back to said aquarium.

16. A filter assembly for the purification of contaminated aquarium water in an aquarium by the action of aerobic bacteria, said assembly comprising:
(a) a stretchable membrane structure in the form of a stretchable bag having an inlet for receiving said contaminated water in the interior of the bag and having a plurality of enlargeable interstices defining water passages extending from the interior of the bag to the exterior thereof, said membrane structure providing support surface area for the propagation of aerobic bacteria capable of acting upon and digesting said contaminating material;
(b) pressure supply means for supplying contaminated aquarium water through said interstices from the interior of the bag to the exterior thereof at a pressure sufficient to stretch said membrane structure and enlarge said interstices as they become clogged by the accumulation of said contaminating material and bacteria whereby the flow of water through the interstices is continues; and
(c) support means for supporting the filter bag exteriorly of said aquarium, said support means comprising:
(1) a trough in which said bag is located, said trough having a spillway connecting the interior thereof to the aquarium for directing water passing through the interstices in the wall of the bag, from the interior thereof to the exterior, back to said aquarium.

17. The filter assembly according to claim 16, wherein:
(a) said bag is located in the interior of the trough at a position at least partially below the spillway.

18. The filter assembly according to claim 17, wherein:
(a) said bag is located in the interior of the trough at a position entirely below the spillway.

* * * * *

UNITED STATES PATENT AND TRADEMARK OFFICE
CERTIFICATE OF CORRECTION

PATENT NO. : 4,622,148
DATED : November 11, 1986
INVENTOR(S) : Allan H. Willinger It is certified that error appears in the above—identified patent and that said Letters Patent is hereby corrected as shown below:

Column 2, line 25, after "web" and before "closely" insert --of--;

Column 6, line 42, "pump 1" should read --pump 30--;

Column 9, line 17, after "bag" and before "having" insert --and--;

Column 9, line 48, "with" should read --within--;

Column 10, line 55, "continues" should read --continued--;

Column 12, line 2, "continues" should read --continued--.

Signed and Sealed this

Twenty-first Day of April, 1987

*Attest:*

DONALD J. QUIGG

*Attesting Officer*  *Commissioner of Patents and Trademarks*